United States Patent
Moh et al.

(10) Patent No.: US 8,941,725 B2
(45) Date of Patent: Jan. 27, 2015

(54) METHOD OF PROCESSING THREE-DIMENSIONAL STEREOSCOPIC IMAGE DATA AND DISPLAY APPARATUS FOR PERFORMING THE SAME

(75) Inventors: Sang-Moon Moh, Hwaseong-si (KR); Mi-Sun Lee, Goyang-si (KR); Sang-Yong No, Asan-si (KR); Seung-Cheol Lee, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 522 days.

(21) Appl. No.: 13/287,474

(22) Filed: Nov. 2, 2011

(65) Prior Publication Data
US 2012/0169720 A1    Jul. 5, 2012

(30) Foreign Application Priority Data
Dec. 29, 2010 (KR) .................. 10-2010-0137992

(51) Int. Cl.
*H04N 13/04* (2006.01)
*G09G 3/36* (2006.01)
*H04N 13/00* (2006.01)

(52) U.S. Cl.
CPC ............. *H04N 13/0452* (2013.01); *G09G 3/36* (2013.01); *G09G 3/3696* (2013.01); *G09G 3/3614* (2013.01); *H04N 13/0025* (2013.01); *H04N 13/0438* (2013.01); *H04N 13/0497* (2013.01); *H04N 2213/002* (2013.01)

USPC ................... 348/51; 348/55; 345/87; 345/94; 345/96

(58) Field of Classification Search
None
See application file for complete search history.

(56) References Cited

U.S. PATENT DOCUMENTS

| | | | |
|---|---|---|---|
| 6,853,362 B2 * | 2/2005 | Bu ................................. | 345/96 |
| 7,339,566 B2 | 3/2008 | Moh | |
| 7,786,966 B2 | 8/2010 | Nakanishi et al. | |
| 2011/0273463 A1 * | 11/2011 | Lee et al. ..................... | 345/545 |

FOREIGN PATENT DOCUMENTS

| | | |
|---|---|---|
| JP | 2008-262105 | 10/2008 |
| KR | 10-2008-0043065 | 8/2010 |

* cited by examiner

*Primary Examiner* — William C Vaughn, Jr.
*Assistant Examiner* — Michael Bennett
(74) *Attorney, Agent, or Firm* — H.C. Park & Associates, PLC (57) ABSTRACT

A method of processing three-dimensional (3D) stereoscopic image data is provided that includes comparing the polarity of image data of a present frame with the polarity of image data of a previous frame. The image data of the present frame are compensated according to the result of the comparison. The image data of the present frame is compensated to generate first compensation data, when the polarity of the image data of the present frame is opposite to the polarity of the image data of the previous frame, with respect a reference voltage.

15 Claims, 9 Drawing Sheets

METHOD OF PROCESSING THREE-DIMENSIONAL STEREOSCOPIC IMAGE DATA AND DISPLAY APPARATUS FOR PERFORMING THE SAME

CROSS-REFERENCE TO RELATED APPLICATION

This application claims priority from and the benefit of Korean Patent Application No. 2010-0137992, filed on Dec. 29, 2010, which is hereby incorporated by reference for all purposes as if fully set forth herein.

BACKGROUND OF THE INVENTION

1. Field of the Invention

Exemplary embodiments of the present invention relate to a method of processing three-dimensional (3D) stereoscopic image data and a display apparatus to perform the method of processing the 3D stereoscopic image data.

2. Discussion of the Background

Generally, a display apparatus displays a two-dimensional (2D) image. Recently, however, the demand for three-dimensional (3D) stereoscopic images in games, movies, etc., has increased.

A stereoscopic image display apparatus generally displays a stereoscopic image using a principle of binocular parallax between a viewer's two eyes. For example, since the left and right eyes of a viewer are spaced apart from each other, two different images, representing two different viewing angles, are shown to the eyes, which are then interpreted by the viewer's brain as a 3D image.

Methods using the binocular parallax principal are divided into stereoscopic-type methods and auto-stereoscopic-type methods. The stereoscopic-type methods may be divided into anaglyph-type methods, which use glasses having blue and red lenses, and liquid crystal shutter glass-type methods, in which a left-eye image and a right-eye image are selectively displayed to the left and right eyes.

Generally, an LCD apparatus employing the liquid crystal shutter glass-type method opens a left-eye shutter for the left eye and closes a right-eye-shutter for the right eye, while displaying the left-eye image during a first frame, to display the left eye image to the left eye. Thereafter, the right-eye-shutter is opened and the left-eye shutter is closed, while displaying the right-eye image during a second frame, to display the right-eye image the right eye. By repeating the method, each of the left eye and the right eye recognizes different images, and thus, the viewer recognizes a 3D-effect.

The liquid crystal shutter glasses-type method needs a minimum time for opening the shutter glasses and recognizing the image, so that a vertically blanking period in one frame is sufficiently increased. Thus, an effective charge time for substantially charging a data voltage to a pixel is decreased. In addition, a reversing method is applied, according to a driving characteristic of a liquid crystal, resulting in different charging rates. As a result, image distortions may occur, like a greenish phenomenon, a lack of vertical uniformity, and crosstalk.

SUMMARY OF THE INVENTION

Exemplary embodiments of the present invention provide a method of processing 3D stereoscopic image data capable of enhancing display quality of 3D stereoscopic images.

Exemplary embodiments of the present invention also provide a display apparatus for performing the method.

Additional features of the invention will be set forth in the description which follows, and in part will be apparent from the description, or may be learned by practice of the invention.

According to an exemplary embodiment of the present invention, provided is a method of processing three-dimensional (3D) stereoscopic image data, comprising comparing the polarity of image data of a present frame with the polarity of image data of a previous frame. The image data of the present frame are compensated according to the compared result.

According to another exemplary embodiment of the present invention, a display apparatus includes a display panel to display an image, a timing controller, and a data driver. The timing controller compares the polarity of image data of a present frame with the polarity of image data of a previous frame, and adjusts the image data of the present frame according to the result of the comparison. The data driver converts data provided from the timing controller to a data voltage, sets a polarity of the data voltage, and outputs the data voltage to the display panel.

According to aspects of the present invention, the compensation data are generated by comparing the polarity of the left-eye image data or the right-eye image data of the present frame, and the polarity of the image data of the previous frame, so that display defects may be prevented, due to a luminance difference between the left-eye image data and the right-eye image data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 1:
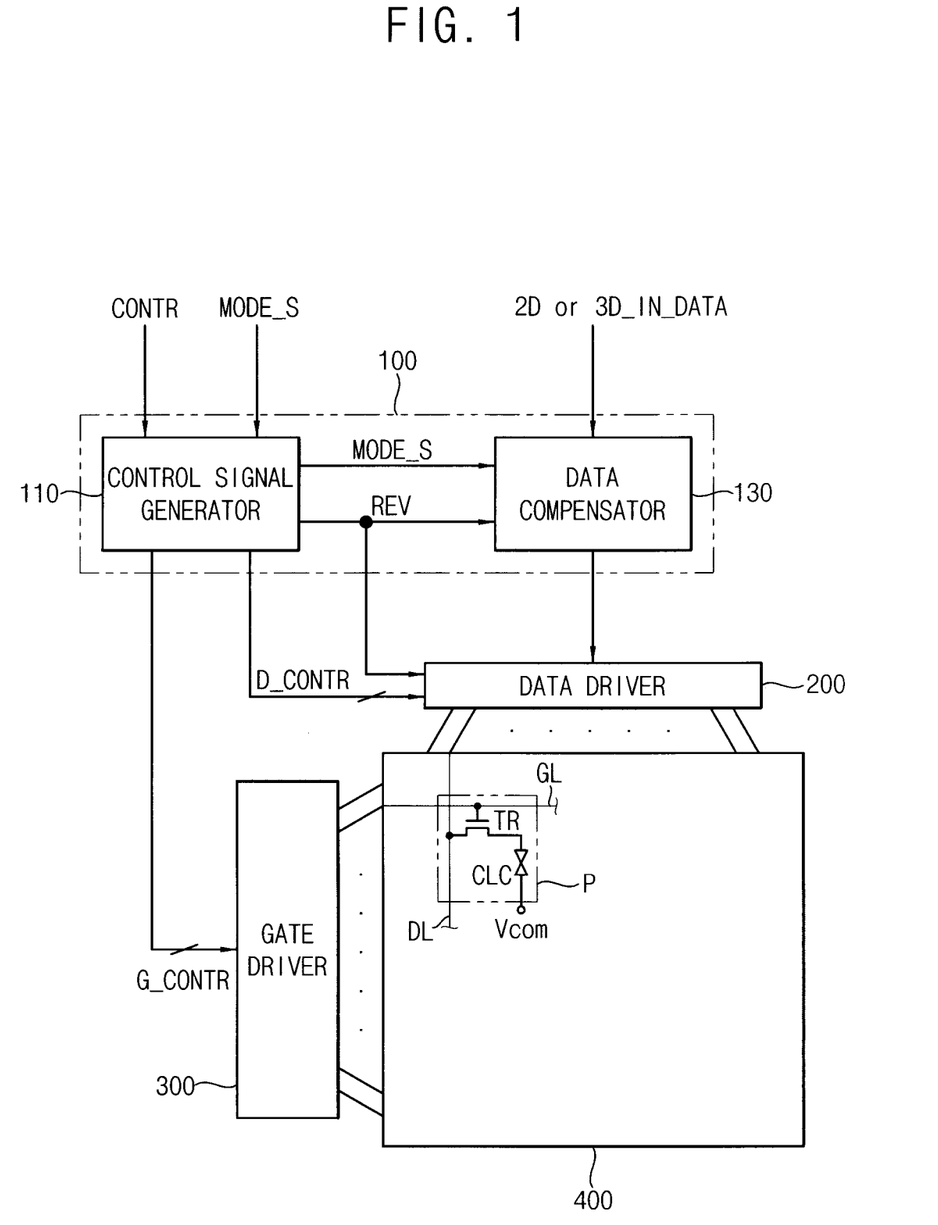
FIG. 1 is a block diagram illustrating a display apparatus, according to an exemplary embodiment of the present invention.

FIG. 1 is a block diagram illustrating a display apparatus, according to an exemplary embodiment of the present invention. Referring to FIG. 1, the display apparatus includes a timing controller 100, a data driver 200, a gate driver 300, and a display panel 400.

The timing controller 100 includes a control signal generator 110 and a data compensator 130. The control signal generator 110 generates a data control signal D_CONTR and a gate control signal G_CONTR, respectively controlling the driving timing of the data driver 200 and the gate driver 300, based on a received control signal CONTR and mode identification signal MODE_S. The data control signal D_CONTR may include a vertical synchronizing signal, a horizontal synchronizing signal, a data enable signal, a dot clock signal, a load signal, and the like. The gate control signal G_CONTR may include a vertical start signal, a gate enable signal, a gate clock signal, and the like. The data control signal D_CONTR may include a reverse control signal REV. The reverse control signal REV is provided to the data compensator 130, to control the data compensator 130. The timing controller 100 may generate the reverse control signal REV, which is reversed after a one frame period in a two-dimensional (2D) flat image mode, and may generate the reverse control signal REV, which is reversed after a two-frame period in a three-dimensional (3D) stereoscopic image mode.

The timing controller 100 receives the mode identification signal MODE_S synchronized with received image data. The mode identification signal MODE_S is a 2D flat image mode signal, when the image data are 2D flat image data. In addition, the mode identification signal MODE_S is a 3D stereoscopic image mode signal, when the image data are 3D stereoscopic image data. The timing controller 100 provides the data compensator 130 with the mode identification signal MODE_S.

The data compensator 130 compares the 2D flat image data or the 3D stereoscopic image data of a present frame with image data of a previous frame, and generates compensation data for an over-driving or an under-driving, based on the mode identification signal MODE_S and the reverse control signal REV. According to the present exemplary embodiment, in the 2D flat image mode, the data compensator 130 maintains the image data received during the present frame, and outputs the image data of the present frame without compensating the image data of the present frame.

The data compensator 130 compensates the image data of the present frame, based on the reverse control signal REV, in the 3D stereoscopic image mode. For example, when the polarity of the image data of the present frame is reversed to the polarity of the image data of the previous frame, with respect to a reference voltage, the data compensator 130 compensates the image data of the present frame, according to the compensation data of the over-driving or the under-driving, based on the reverse control signal REV. In contrast, when the polarity of the image data of the present frame is substantially the same as the polarity of the image data of the previous frame, with respect to a reference voltage, the data compensator 130 outputs the image data of the present frame, without compensating the image data of the present frame.

Accordingly, when the polarity of the present frame is reversed with respect to the polarity of the previous frame, the fluctuation range of a data voltage is increased. Thus, the compensation data for over-driving the liquid crystal are generated, considering a rising time and a falling time of the liquid crystal. The compensation data over-drives the liquid crystal to enhance a charging rate and to display the image at a target luminance. Therefore, a luminance difference, of a left-eye image and a right-eye image of the 3D stereoscopic image, is prevented.

The data driver 200 converts the image data or the compensation data, which are received from the data compensator 130, to analog image data, based on the data control signal D_CONTR. In addition, the data driver 200 determines whether the polarity of the data voltage is a first polarity or a second polarity, with respect to the reference voltage, based on the reverse control signal REV, and outputs the data voltage to the display panel 400.

The gate driver 300 generates a plurality of gate signals based on the gate control signal G_CONTR. The gate driver 300 sequentially outputs the gate signals to the display panel 400 in synchronization with the data voltage output from the data driver 200, by a horizontal line unit.

The display panel 400 includes a plurality of pixels. Each of the pixels P includes a switching element TR connected to data and gate lines GL and DL, and a liquid crystal capacitor CLC connected to the switching element TR. For example, when the switching element TR is turned on by the gate signal applied to the gate line GL, the data voltage applied to the data line DL is charged to the liquid crystal capacitor CLC, so that the pixels P display an image.

Figure 2:
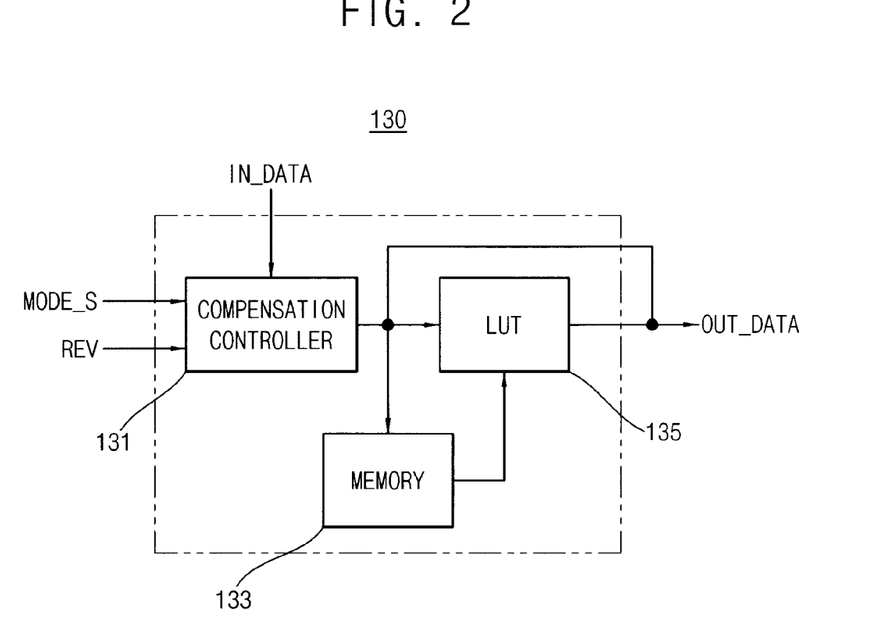
FIG. 2 is a block diagram illustrating a data compensator of FIG. 1.
Figure 3:
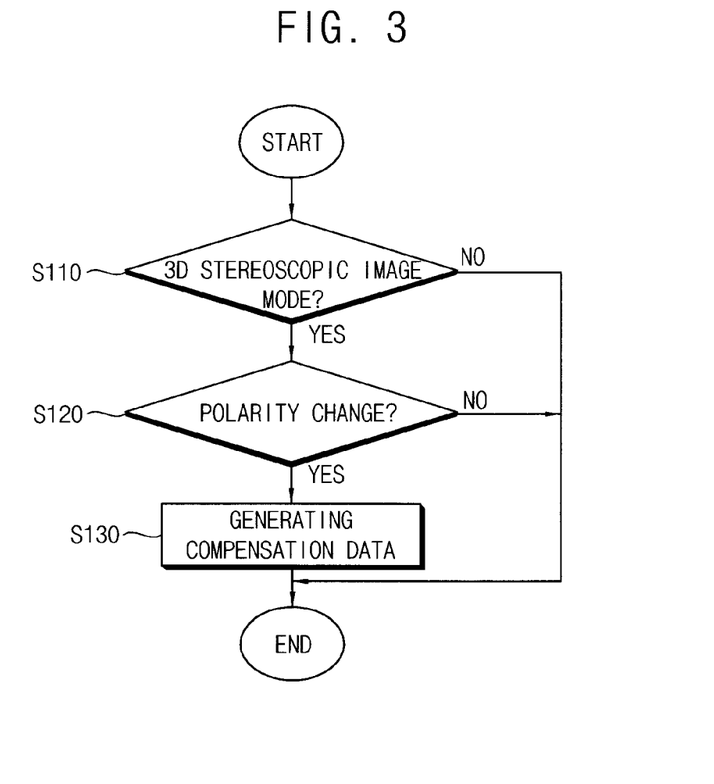
FIG. 3 is a flow chart for explaining a method for processing data by the data compensator of FIG. 2.

FIG. 2 is a block diagram illustrating a data compensator of FIG. 1. FIG. 3 is a flow chart for explaining a method of processing data with the data compensator of FIG. 2. Referring to FIGS. 1 and 2, the data compensator 130 includes a compensation controller 131, a memory 133, and a look-up table (LUT) 135.

The compensation controller 131 generates the compensation data of the image data received during the present frame, based on the mode identification signal MODE_S and the reverse control signal REV. The memory 133 stores the image data, and provides the LUT 135 with the stored image data as reference data. The reference data may be image data received during the previous frame, corresponding to the image data received during the present frame.

The LUT 135 stores the compensation data in a LUT format. The compensation data are mapped onto first reference data corresponding to the present frame and second reference data corresponding to the previous frame. For example, the compensation controller 131 outputs data, which are mapped onto the first and second reference data corresponding to the image data received during the present frame, as the compensation data of the image data received during the present frame, using the LUT 135.

The first and second reference data may be grayscale data sampled from all grayscale data, to reduce a size of the LUT 135. When the image data of the present frame is not included in the first and second reference data of the LUT 135, the compensation controller 131 may generate the compensation data of the present frame, by using an interpolation method that uses the compensation data stored in the LUT 135.

The compensation controller 131 receives the mode identification signal MODE_S, the reverse control signal REV, and the image data. For example, the compensation controller 131 may determine whether the image mode of the image data is the 2D flat image mode or the 3D stereoscopic image mode, based on the mode identification signal MODE_S.

The compensation controller 131 determines the image mode, based on the mode identification signal MODE_S (step S110). For example, in the 2D flat image mode, the compensation controller 131 outputs the image data without compensating the image data.

In the 3D stereoscopic image mode, the compensation controller 131 compares the polarity of the image data of the present frame with the polarity of the image data of the previous frame, based on the reverse control signal REV. When the polarity of the image data of the present frame is substantially the same as the polarity of the image data of the previous frame (step S120), the compensation controller 131 outputs the image data without compensating the image data. However, when the polarity of the image data of the present frame is opposite to the polarity of the image data of the previous frame, with respect to the reference voltage, the compensation controller 131 compensates the image data using the memory 133 and the LUT 135, to generate the compensation data (step S130).

Figure 4:
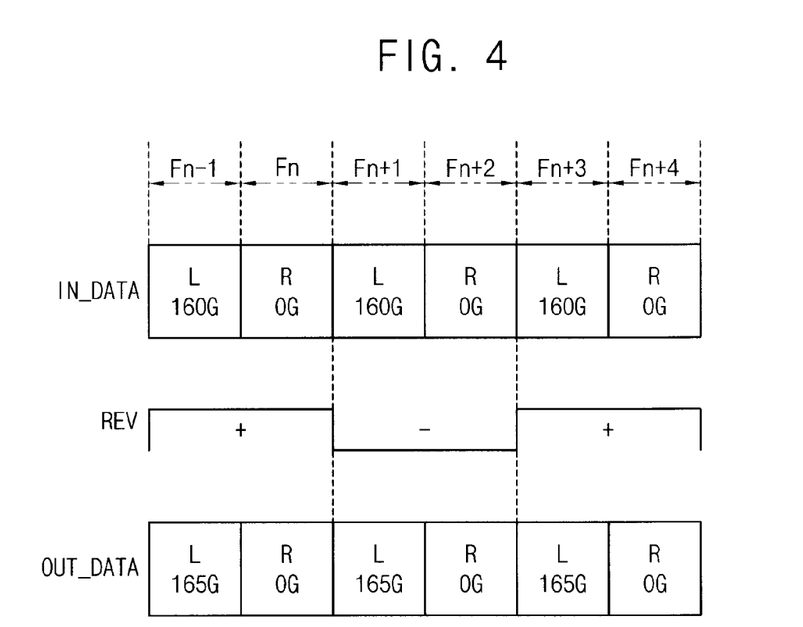
FIG. 4 is a timing chart illustrating input signals of the data compensator of FIG. 2.

FIG. 4 is a timing chart illustrating input signals of the data compensator of FIG. 2. Referring to FIGS. 2 and 4, the data compensator 130 receives right-eye R image data IN_DATA having a 0 grayscale value, in an N-th frame Fn. The grayscale data are 8-bit data, and may include grayscale values of from 0 to 255. The image data IN_DATA are grayscale data of the image displayed by one pixel of the display panel.

The compensation controller 131 compares the polarity (+) of the right-eye R image data of the N-th frame F(n) with the polarity (+) of left-eye L image data of an (N−1)-th frame F(n−1), which is a frame previous to the N-th frame Fn, based on the reverse control signal REV. The compensation controller 131 determines that the polarity of the right-eye R image data of the N-th frame Fn is substantially the same as the polarity of the left-eye L image data of the (N−1)-th frame F(n−1). Then, the compensation controller 131 outputs the right-eye R image data having the 0 grayscale value as OUT_DATA, without compensating the right-eye R image data.

The data compensator 130 receives left-eye L image data IN_DATA having a 160 grayscale value in an (N+1)-th frame F(n+1), which is a frame subsequent to the N-th frame F(n). The compensation controller 131 compares the polarity (−) of the left-eye L image data of the (N+1)-th frame F(n+1) with the polarity (+) of the right-eye R image data of the N-th frame Fn, based on the reverse control signal REV. The compensation controller 131 determines that the polarity of the left-eye L image data of the (N+1)-th frame F(n+1) is reversed with respect to the polarity of the right-eye R image data of the N-th frame Fn. Then, the compensation controller 131 compensates the left-eye L image data of the (N+1)-th frame F(n+1), to generate compensation data having a 165 grayscale value, using the LUT 135, and outputs the compensation data having the 165 grayscale value as OUT_DATA, to achieve an actual grayscale value of 160, as described below with reference to FIG. 5.

The data compensator 130 receives right-eye R image data IN_DATA having the 0 grayscale value in an (N+2)-th frame F(n+2). The compensation controller 131 compares the polarity (−) of the right-eye R image data of the (N+2)-th frame F(n+2) with the polarity (−) of the left-eye L image data of the (N+1)-th frame F(n+1), based on the reverse control signal REV. The compensation controller 131 determines that the polarity of the right-eye R image data of the (N+2)-th frame F(n+2) is substantially the same as the polarity of the left-eye L image data of the (N+1)-th frame F(n+1). Then, the compensation controller 131 maintains the right-eye R image data of the (N+2)-th frame F(n+2), and outputs the right-eye R image data having the 0 grayscale value as OUT_DATA, without compensating the right-eye R image data.

Accordingly, when the polarity of the present frame is reversed with respect to the polarity of the previous frame, a fluctuation range of a data voltage is increased. Thus, the compensation data for over-driving the liquid crystal are generated, according to a rising time and a falling time of the liquid crystal. Thus, a luminance difference between the left-eye image and the right-eye image of the 3D stereoscopic image is decreased, so that display quality may be enhanced.

Figure 5:
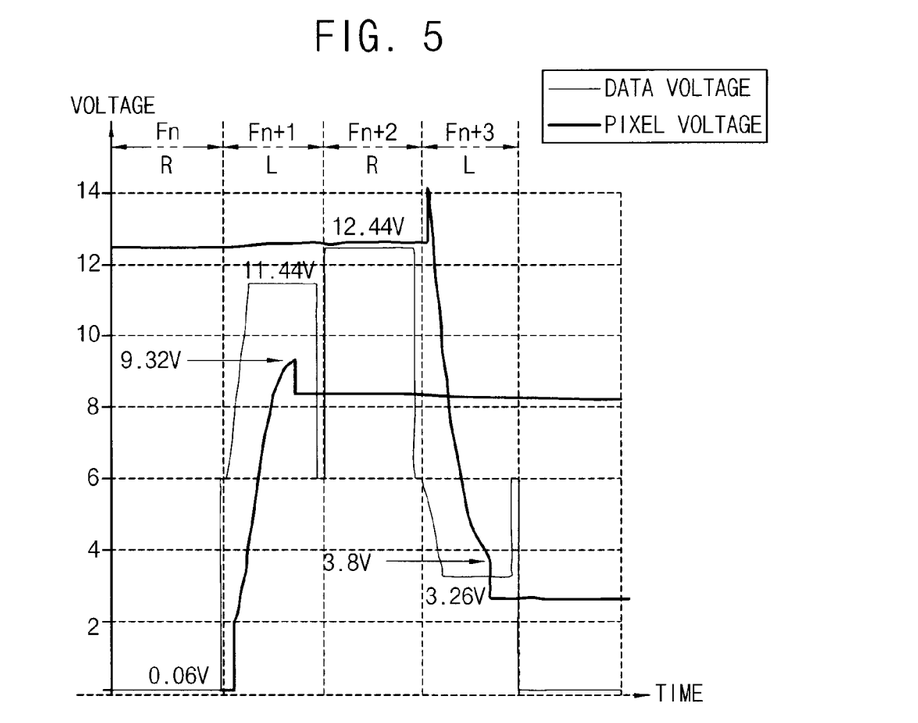
FIG. 5 is a waveform illustrating a measured charging rate of a pixel, according to the data compensator of FIG. 2.

FIG. 5 is a waveform illustrating a measured charging rate of a pixel, according to the data compensator of FIG. 2. Referring to FIGS. 1 and 5, a charging rate of the pixel was measured to compare the luminance of the left-eye image with the luminance of the right-eye image.

The grayscale value of the left-eye L image data is 160, which is an intermediate grayscale value, and the grayscale value of the right-eye R image data is 0, which is a black grayscale value. The polarity of the left-eye L image data was reversed with respect to the polarity of the image data of the previous frame, and the polarity of the right-eye R image data was substantially the same as the polarity of the image data of the previous frame, when the charging rate of the pixel corresponding to the left-eye L image data was measured.

As illustrated in FIG. 5, a data voltage of the right-eye R image data input to the N-th frame Fn is about 0.06V, and a data voltage of the 160 grayscale of the left-eye L image data input in the (N+1)-th frame F(n+1) is about 9.32V. Here, the reference voltage dividing the polarity of the data voltage is about 6V.

The data compensator 130 determines that the polarity of the left-eye L image data of the (N+1)-th frame F(n+1) is reversed with respect to the polarity of the right-eye R image data of the N-th frame Fn. Then, the data compensator 130 generates the compensation data of the (N+1)-th frame F(n+1), using the LUT 135. The compensation data of the (N+1)-th frame F(n+1) is about 11.44V, which is higher than 9.32V. The data voltage of about 11.44V is provided to the pixel, and the pixel is charged with a voltage of about 9.32V. Therefore, the pixel displays the left-eye L image data of the (N+1)-th frame F(n+1) having the 160 grayscale.

The data compensator 130 determines that the polarity of the left-eye L image data of an (N+3)-th frame F(n+3) is reversed. Then, the data compensator 130 generates the compensation data of the (N+3)-th frame F(n+3), using the LUT 135. As shown in FIG. 5, a data voltage of the black grayscale of the right-eye R image data input to the (N+2)-th frame F(n+2) is about 12.44V, and a data voltage of the 160 grayscale of the left-eye L image data input to the (N+3)-th frame F(n+3) is about 3.8V. The data compensator 130 generates compensation data of the (N+3)-th frame F(n+3), and the compensation data of the (N+3)-th frame F(n+3) have a data voltage of about 3.26V, which is lower than about 3.8V. The data voltage of about 3.26V is provided to the pixel, and the pixel is charged with a voltage of about 3.8V. Therefore, the pixel displays the left-eye L image data of the (N+3)-th frame F(n+3), having the 160 grayscale.

Figure 6:
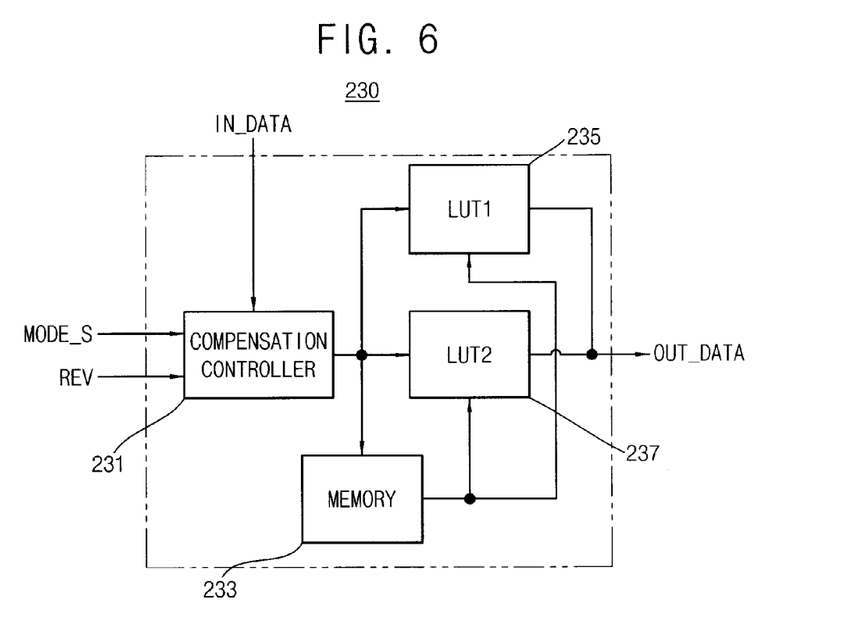
FIG. 6 is a block diagram illustrating a data compensator, according to another exemplary embodiment of the present invention.
Figure 7:
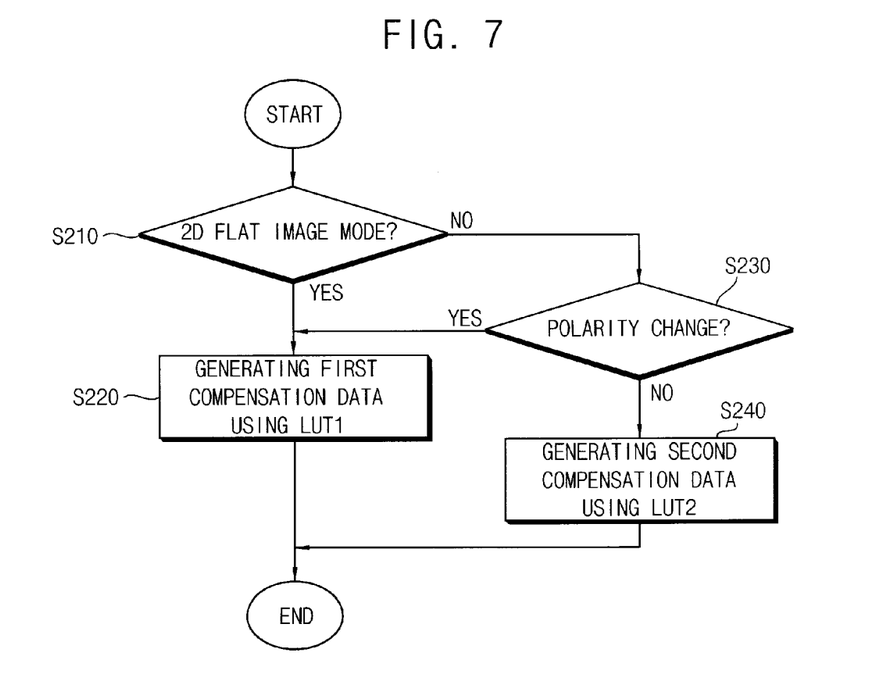
FIG. 7 is a flow chart for explaining a method for processing data of the data compensator of FIG. 6.

FIG. 6 is a block diagram illustrating a data compensator, according to another exemplary embodiment of the present invention. FIG. 7 is a flow chart for explaining a method for processing data of the data compensator of FIG. 6. Referring to FIGS. 1, 6, and 7, a data compensator 230 includes a compensation controller 231, a memory 233, and first and second LUTs 235 and 237.

The compensation controller 231 selectively generates first compensation data or second compensation data of the image data received during the present frame, based on the reverse control signal REV and the mode identification signal MODE_S. The first and second compensation data may be determined according to the fluctuation range of the data voltage, between the present frame and the previous frame. For example, when the fluctuation range of the data voltage is relatively large, the first compensation data may be generated when the polarity of the image data of the present frame is opposite to the polarity of the image data of the previous frame, with respect to the reference voltage. When the fluctuation range of the data voltage is relatively small, the second compensation data may be generated when the polarity of the image data of the present frame is substantially the same as the polarity of the image data of the previous frame, with respect to the reference voltage.

The memory 233 stores the image data, and provides the first and second LUTs 235 and 237 with the stored image data as reference data. The reference data may be the image data received during the previous frame, corresponding to the image data received during the present frame.

The first LUT 235 stores the first compensation data in a LUT format. The compensation data are mapped onto first reference data corresponding to the present frame and second reference data corresponding to the previous frame.

The second LUT 237 stores the second compensation data in the LUT format. The compensation data are mapped onto the first reference data and the second reference data.

The first and second reference data may be grayscale data sampled from a total amount of grayscale data, to reduce the sizes of the first and second LUTs 235 and 237. When the image data of the present frame do not exist in the first and second reference data of the first and second LUTs 235 and 237, the compensation controller 231 generates the compensation data of the present frame, by an interpolation method, using the compensation data stored in the first and second LUTs 235 and 237.

The compensation controller 231 receives the mode identification signal MODE_S, the reverse control signal REV, and the image data. For example, the compensation controller 231 may determine whether the image mode of the image data is the 2D flat image mode or the 3D stereoscopic image mode, based on the mode identification signal MODE_S.

The compensation controller 131 determines whether the image mode of the image data is the 2D flat image mode, based on the mode identification signal MODE_S (step S210). When the image mode of the image data is the 2D flat image mode, the compensation controller 231 generates the first compensation data of the image data, using the first LUT 235 (step S220). When the image mode of the image data is the 2D flat image mode, the polarity of the image data is reversed after a one frame period. Thus, when the polarity of the image data of the present frame is reversed with respect to the polarity of the image data of the previous frame, the compensation controller 131 generates the first compensation data using the first LUT 235.

When the image mode of the image data is the 3D stereoscopic image mode, the compensation controller 231 compares the polarity of the image data of the present frame with the polarity of the image data of the previous frame, based on the reverse control signal REV (step S230). When the polarity of the image data of the present frame is reversed with respect to the polarity of the image data of the previous frame, the compensation controller 231 generates the first compensation data of the image data using the first LUT 235 (step S220).

When the polarity of the image data of the present frame is substantially the same as the polarity of the image data of the previous frame (step S220), the compensation controller 231 generates the second compensation data of the image data, using the second LUT 237 (step S240).

Thus, when the polarity of the image data of the present frame is reversed with respect to the polarity of the image data of the previous frame, and the fluctuation range of the data voltage is relatively large, the data compensator 230 generates the first compensation data using the first LUT 235. When the fluctuation range of the data voltage is relatively small, and the polarity of the image data of the present frame is substantially the same as the polarity of the image data of the previous frame, the data compensator 230 generates the second compensation data using the second LUT 237.

Figure 8A:
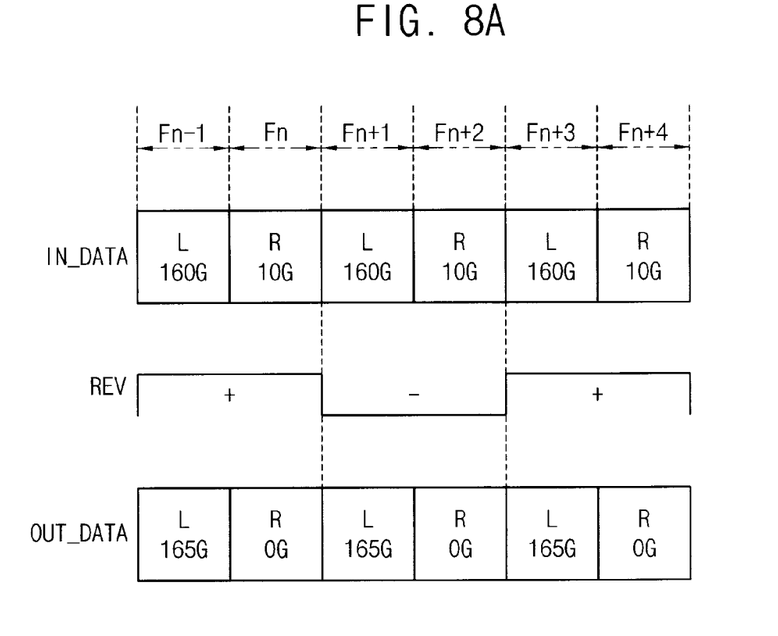
FIGS. 8A and 8B are timing charts illustrating input and output signals of the data compensator in a 3D stereoscopic image mode of FIG. 7.
Figure 8B:
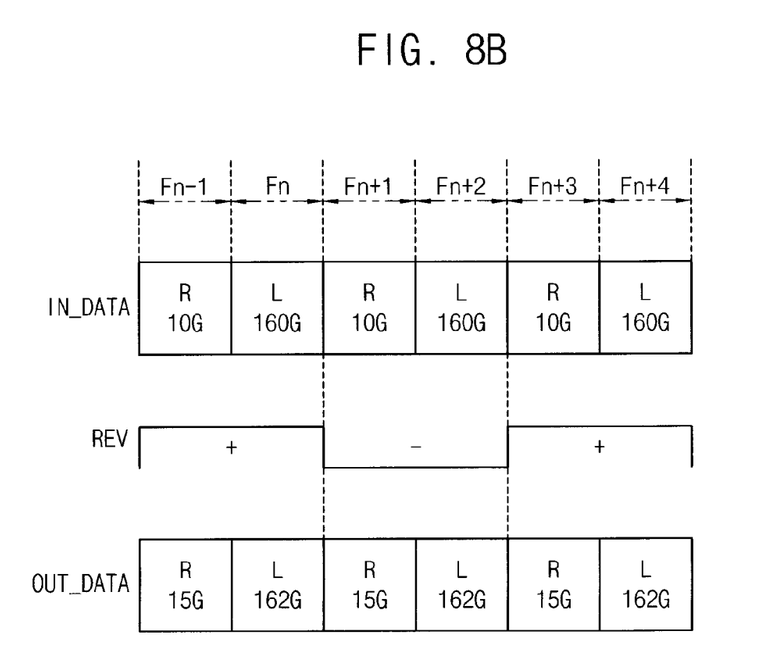

FIGS. 8A and 8B are timing charts illustrating input and output signals of the data compensator, in a 3D stereoscopic image operation mode of FIG. 7. Referring to FIG. 8A, the polarity of the data voltage is changed, when the image data is changed from right-eye R image data to left-eye L image data.

The data compensator 230 receives the right-eye R image data IN_DATA having a 10 grayscale value, in an N-th frame Fn. The grayscale data are 8-bit data, and may include grayscale values of from 0 to 255. The image data IN_DATA are grayscale data of the image displayed by one of the pixels of the display panel.

The compensation controller 231 compares the polarity (+) of the right-eye R image data of the N-th frame Fn with the polarity (+) of the left-eye L image data of an (N−1)-th frame F(n−1), based on the reverse control signal REV. The compensation controller 231 determines that the polarity of the right-eye R image data of the N-th frame Fn is substantially the same as the polarity of the left-eye L image data of the (N−1)-th frame F(n−1). Then, the compensation controller 231 compensates the right-eye R image data having the 10 grayscale value, to generate compensation data having a 0 grayscale value, using the second LUT 237, and outputs the compensation data having the 0 grayscale value as OUT_DATA.

The data compensator 230 receives the left-eye L image data IN_DATA having 160 grayscale value in an (N+1)-th frame F(n+1). The compensation controller 231 compares the polarity (−) of the left-eye L image data of the (N+1)-th frame F(n+1) with the polarity (+) of the right-eye R image data of the N-th frame Fn, based on the reverse control signal REV. The compensation controller 231 determines that the polarity of the left-eye L image data of the (N+1)-th frame F(n+1) is reversed with respect to the polarity of the right-eye R image data of the N-th frame Fn. Then, the compensation controller 231 compensates the left-eye L image data of the (N+1)-th frame F(n+1), having the 160 grayscale value, to generate compensation data having a 165 grayscale value, using the first LUT 235, and outputs the compensation data having the 165 grayscale value as OUT_DATA.

The data compensator 230 receives the right-eye R image data IN_DATA having the 10 grayscale value in an (N+2)-th frame F(n+2). The compensation controller 231 compares the polarity (−) of the right-eye R image data of the (N+2)-th frame F(n+2) with the polarity (−) of the left-eye L image data of the (N+1)-th frame F(n+1), based on the reverse control signal REV. The compensation controller 231 determines that the polarity of the right-eye R image data of the (N+2)-th frame F(n+2) is substantially the same as the polarity of the left-eye L image data of the (N+1)-th frame F(n+1). Then, the compensation controller 231 compensates the right-eye R image data having the 10 grayscale value of the (N+2)-th frame F(n+2), to generate compensation data having the 0 grayscale value, using the second LUT 237, and outputs the compensation data having the 0 grayscale value as OUT_DATA.

Referring to FIG. 8B, the polarity of the data voltage is changed when the image data is changed from left-eye L image data to right-eye R image data. The data compensator 230 receives the left-eye L image data IN_DATA having a 160 grayscale value, in an N-th frame Fn. The grayscale data are 8-bit data, and may include grayscale values of from 0 to 255. The image data IN_DATA are grayscale data of the image displayed by one of the pixels of the display panel.

The compensation controller 231 compares the polarity (+) of the left-eye L image data of the N-th frame Fn with the polarity (+) of the right-eye R image data of an (N−1)-th frame F(n−1), based on the reverse control signal REV. The compensation controller 231 determines that the polarity of the left-eye L image data of the N-th frame Fn is substantially the same as the polarity of the right-eye R image data of the (N−1)-th frame F(n−1). Then, the compensation controller 231 compensate the left-eye L image data having the 160 grayscale value, to generate compensation data having a 162 grayscale value, using the second LUT 237, and outputs the compensation data having the 162 grayscale value as OUT_DATA.

The data compensator 230 receives the right-eye R image data IN_DATA having a 10 grayscale value in an (N+1)-th frame F(n+1). The compensation controller 231 compares the polarity (−) of the right-eye R image data of the (N+1)-th frame F(n+1) with the polarity (+) of the left-eye L image data of the N-th frame Fn, based on the reverse control signal REV. The compensation controller 231 determines that the polarity of the right-eye R image data of the (N+1)-th frame F(n+1) is reversed with respect to the polarity of the left-eye L image data of the N-th frame Fn. Then, the compensation controller 231 compensates the right-eye R image data having the 10 grayscale value of the (N+1)-th frame F(n+1), to generate compensation data having a 15 grayscale value, using the first LUT 235, and outputs the compensation data having the 15 grayscale value as OUT_DATA.

The data compensator 230 receives the left-eye L image data IN_DATA having the 160 grayscale value in an (N+2)-th frame F(n+2). The compensation controller 231 compares the polarity (−) of the left-eye L image data of the (N+2)-th frame F(n+2) with the polarity (−) of the right-eye R image data of the (N+1)-th frame F(n+1), based on the reverse control signal REV. The compensation controller 231 determines that the polarity of the left-eye L image data of the (N+2)-th frame F(n+2) is substantially the same as the polarity of the right-eye R image data of the (N+1)-th frame F(n+1). Then, the compensation controller 231 compensate the left-eye L image data having the 160 grayscale value of the (N+2)-th frame F(n+2), to generate compensation data having the 162 grayscale value using the second LUT 237, and outputs the compensation data having the 162 grayscale value as OUT_DATA.

As shown in FIGS. 8A and 8B, when the polarity of the image data of the present frame is reversed with respect to the polarity of the image data of the previous frame, and the fluctuation range of the data voltage is relatively large, the data compensator 230 generates the first compensation data using the first LUT 235. When the fluctuation range of the data voltage is relatively small, and the polarity of the image data of the present frame is substantially the same as the polarity of the image data of the previous frame, the data compensator 230 generates the second compensation data using the second LUT 237. Thus, a luminance difference between the left-eye image and the right-eye image of the 3D stereoscopic image is decreased, so that display quality may be enhanced.

Figure 9:
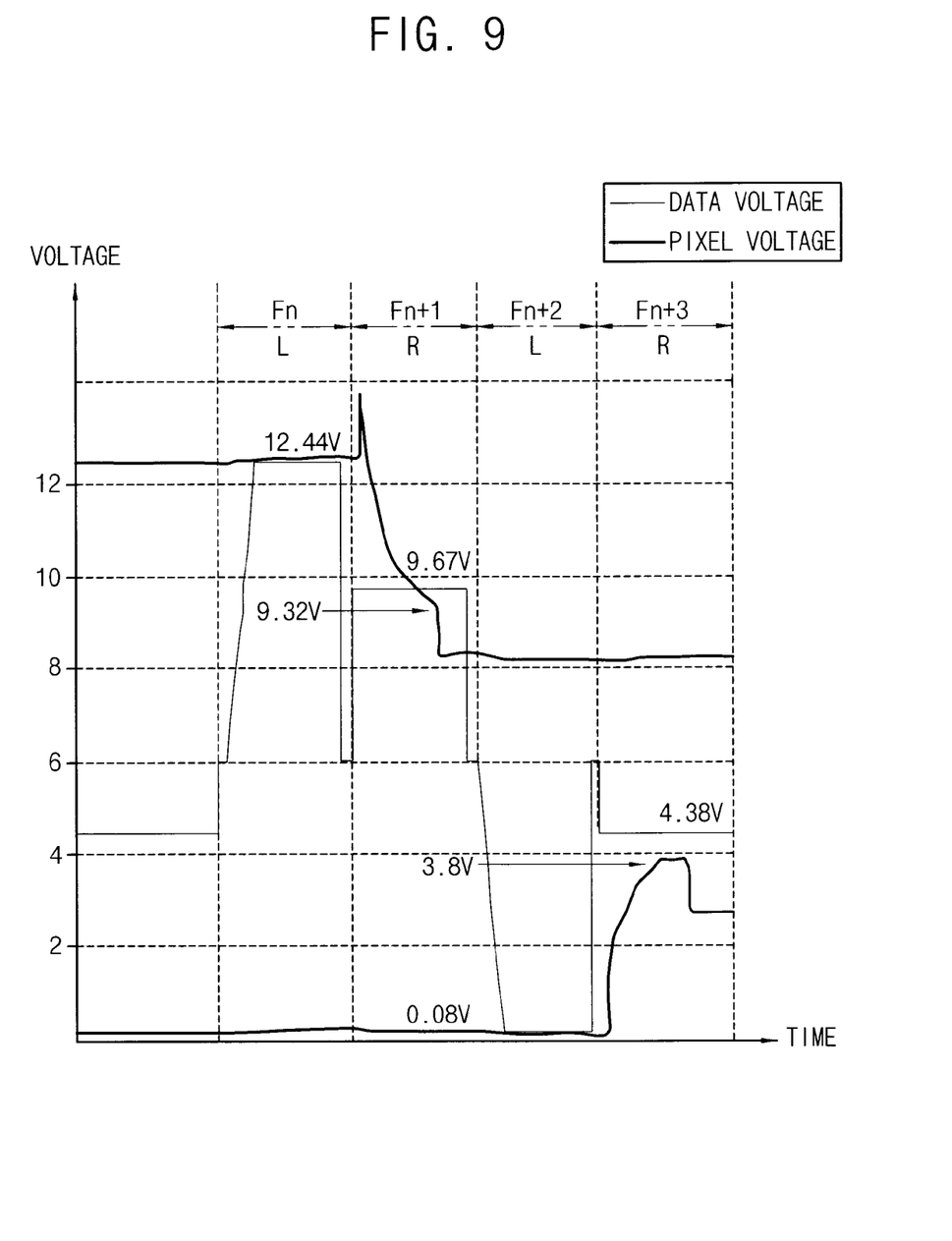
FIG. 9 is a waveform illustrating a measured charging rate of a pixel, according to the data compensator of FIG. 7.

FIG. 9 is a waveform illustrating a measured charging rate of a pixel, according to the data compensator of FIG. 7. Referring to FIG. 9, the charging rate of the pixel was measured to compare the luminance of a left-eye image with the luminance of a right-eye image.

The grayscale value of the right-eye R image data is 60, and the grayscale value of the left-eye L image data is 0. In conditions that the polarity of the left-eye L image data is reversed with respect to the polarity of the image data of the previous frame, and the polarity of the right-eye R image data is substantially the same as the polarity of the image data of the previous frame, the charging rate of the pixel corresponding to the right-eye R image data was measured.

As shown in FIG. 9, a data voltage of the left-eye L image data input to the N-th frame Fn is about 12.44V, and a data voltage of the right-eye R image data input to the (N+1)-th frame F(n+1) is about 9.32V.

The data compensator 230 determines that the polarity of the right-eye R image data of the (N+1)-th frame F(n+1) is substantially the same as the polarity of the image data of the previous frame. Then, the data compensator 230 generates the compensation data of the (N+1)-th frame F(n+1) using the second LUT 237. The compensation data of the (N+1)-th frame F(n+1) have a voltage of about 9.67 V, which is higher than about 9.32V. The data voltage of about 9.67V is provided to the pixel, and the pixel is charged with a voltage of about 9.32V. Therefore, the pixel displays the right-eye R image data of the (N+1)-th frame F(n+1) having the 160 grayscale value as an original luminance.

In addition, the data compensator 230 determines that the polarity of the right-eye R image data of an (N+3)-th frame F(n+3) is substantially the same as the polarity of the image data of the previous frame. Then, the data compensator 230 generates the compensation data of the (N+3)-th frame F(n+3) using the second LUT 237. As shown in FIG. 9, a data voltage of the black grayscale value of the left-eye L image data input to the (N+2)-th frame F(n+2) is about 0.08V, and a data voltage of the 160 grayscale value of the right-eye R image data input to the (N+3)-th frame F(n+3) is about 3.8V. The data compensator 230 generates the compensation data of the (N+3)-th frame F(n+3) using the second LUT 237, and the compensation data of the (N+3)-th frame F(n+3) have a data voltage of about 4.38V, which is higher than about 3.8V. The data voltage of about 4.38V is provided to the pixel, and the pixel is charged with a voltage of about 3.8V. Therefore, the pixel displays the right-eye R image data of the (N+3)-th frame F(n+3) having the 160 grayscale value as an original luminance.

When the polarity of the image data of the present frame is reversed with respect to the polarity of the image data of the previous frame, the luminance difference between the left-eye image and the right-eye image of the 3D stereoscopic image is decreased using the first LUT 235, as shown in FIG. 5. Thus any repetitive explanation will be omitted.

Figure 10:
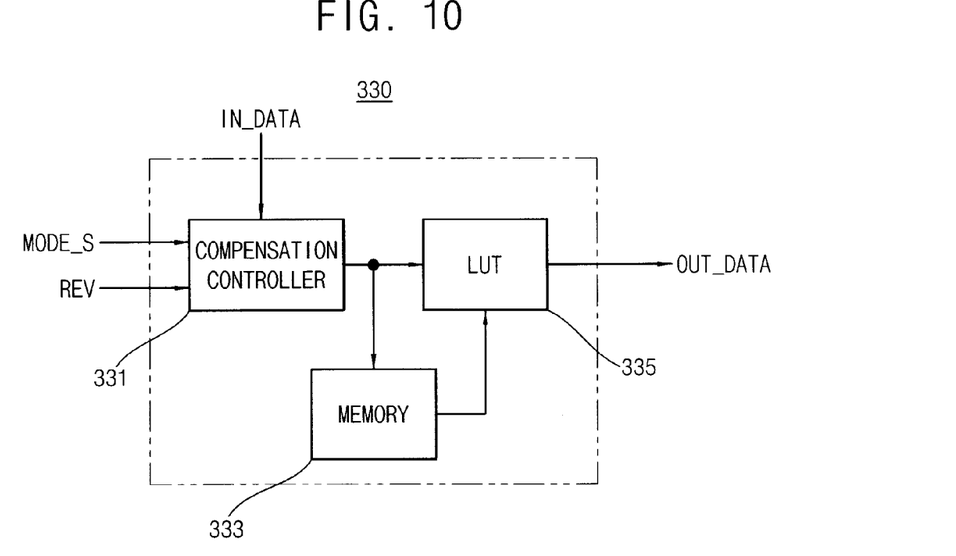
FIG. 10 is a block diagram illustrating a data compensator, according to still another exemplary embodiment of the present invention.
Figure 11:
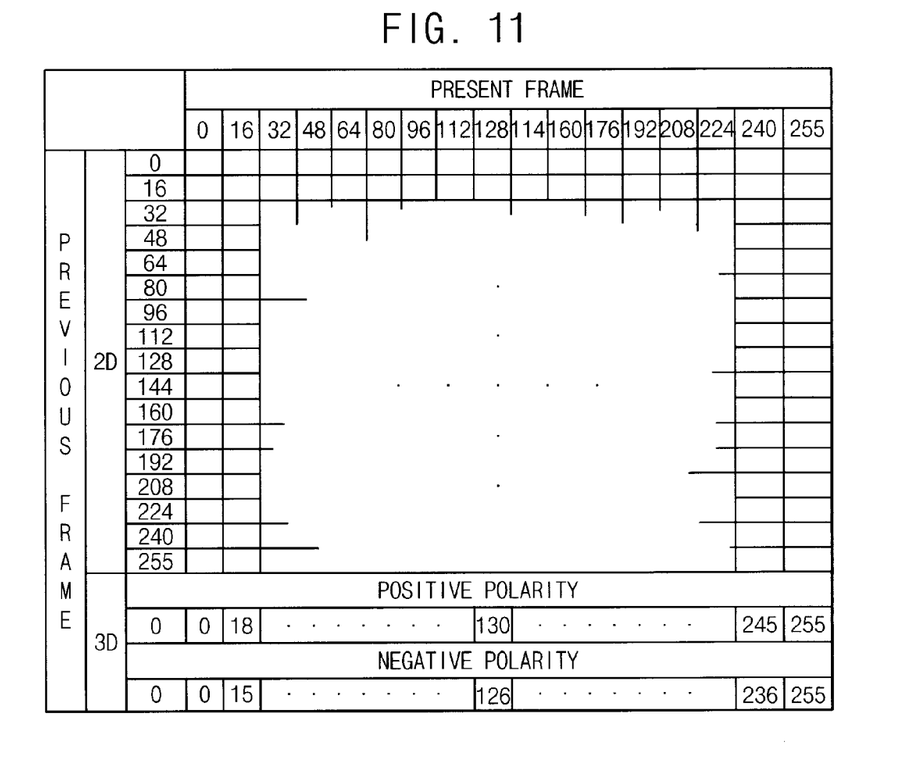
FIG. 11 is a conceptual diagram illustrating a look-up table (LUT) of FIG. 10.

FIG. 10 is a block diagram illustrating a data compensator 330, according to still another exemplary embodiment of the present invention. FIG. 11 is a conceptual diagram illustrating a look-up table (LUT) of FIG. 10. Referring to FIGS. 1, 10, and 11, the data compensator 330 includes a compensation controller 331, a memory 333, and a LUT 335.

The compensation controller 331 determines whether the compensation controller 331 generates compensation data of the image data received during the present frame, based on the reverse control signal REV and the mode identification signal MODE_S. When the image mode of the image data is the 3D stereoscopic image mode, the data compensator 330 sequentially receives the left-eye image data frame, a first black data frame, the right-eye image data frame, and a second black data frame, by a frame unit. The reverse control signal REV has a signal reversed by a two-frame unit. For example, each of the left-eye image data and the first black data has a first polarity with respect to the reference voltage, and each of the right-eye image data and the second black data has a second polarity with respect to the reference voltage.

In the 3D stereoscopic image mode, when the left-eye image data or right-eye image data are received in the present frame, the compensation controller 331 determines the polarity of the image data of the present frame, based on the reverse control signal REV. The compensation controller 331 generates third compensation data, when the image data have the first polarity with respect to the reference voltage, and generates fourth compensation data when the image data have the second polarity with respect to the reference voltage.

For example, considering that a falling time of the liquid crystal is shorter than a rising time of the liquid crystal, the compensation controller 331 may generate compensation data having a relatively small over-driving intensity, when a data voltage changes from a positive polarity to a negative polarity. However, the compensation controller 331 may generate compensation data having a relatively large over-driving intensity, when a data voltage changes from a negative polarity to a positive polarity.

The memory 333 stores the image data, and provides the LUT 335 with the stored image data as reference data. The reference data may be the image data received during the previous frame, corresponding to the image data received during the present frame.

The first LUT 335 may store 2D compensation data for the 2D flat image mode and 3D compensation data for the 3D stereoscopic image mode. Referring to FIG. 11, the 2D compensation data are mapped into first reference data corresponding to the present frame and second reference data corresponding to the previous frame.

The 3D compensation data include the third and fourth compensation data. The third compensation data are mapped into the first reference data corresponding to the left-eye image data or the right-eye image data having the positive (+) polarity of the present frame, and the second reference data corresponding to the image data having the black grayscale value of the previous frame. The fourth compensation data are mapped into the first reference data corresponding to the left-eye image data or the right-eye image data having the negative (−) polarity of the present frame, and the second reference data corresponding to the image data having the black grayscale value of the previous frame. Here, the positive voltage is higher than the reference voltage, and the negative voltage is lower than the reference voltage.

According to a reverse method having a two-frame period between polarity reversals, the third compensation data may be compensation data having a relatively large over-driving intensity, when a data voltage changes from a negative polarity to a positive polarity. The fourth compensation data may be compensation data having a relatively small over-driving intensity, when a data voltage changes from a positive polarity to a negative polarity.

The first and second reference data may be grayscale data sampled from a total amount of grayscale data, to reduce a size of the LUT 335. When the image data of the present frame do not exist in the first and second reference data of the LUT 335, the compensation controller 331 may generate the compensation data of the present frame, by using an interpolation method that uses the compensation data stored in the LUT 335.

Figure 12:
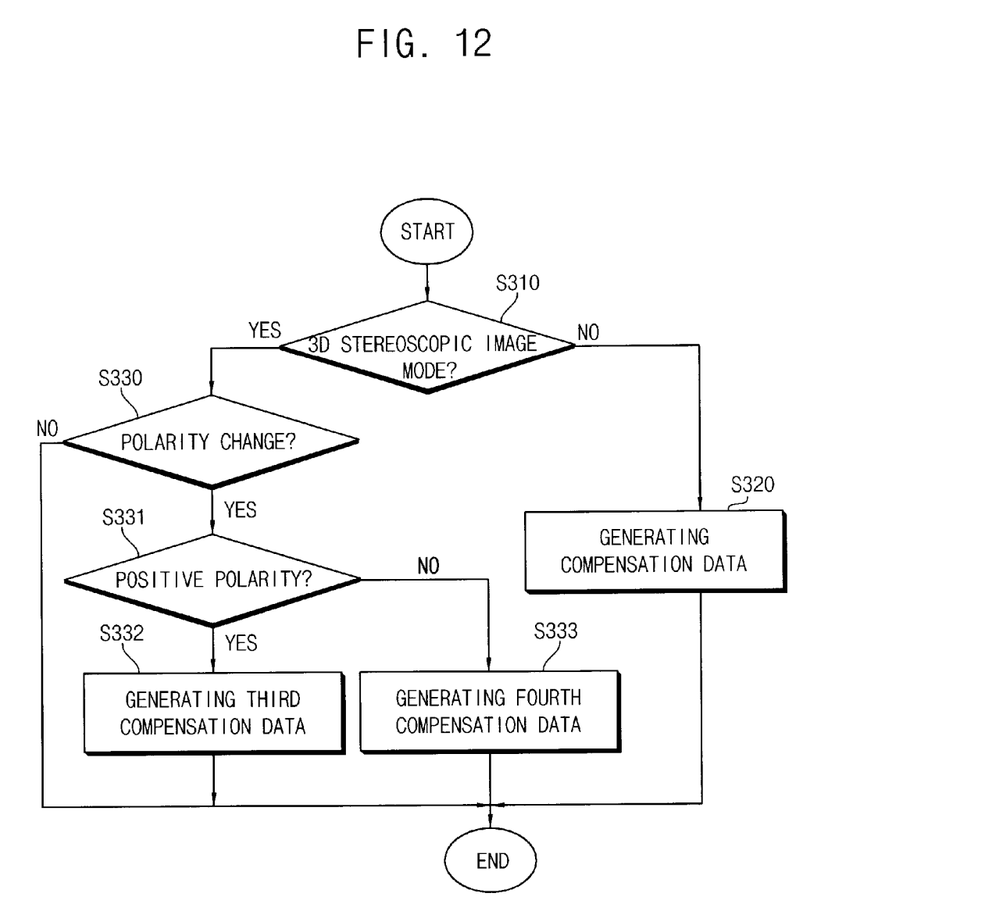
FIG. 12 is a flow chart for explaining a method for processing data of the data compensator of FIG. 10.
Figure 13:
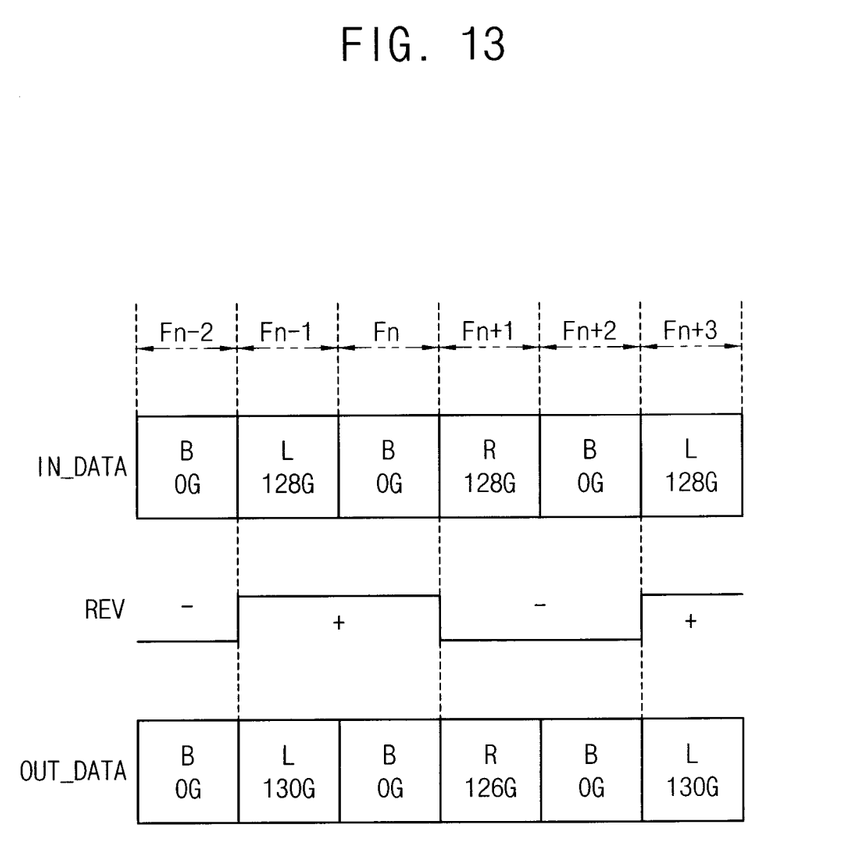
FIG. 13 is a timing chart illustrating input and output signals of the data compensator of FIG. 10, in a 3D stereoscopic image mode.

FIG. 12 is a flow chart for explaining a method for processing data of the data compensator of FIG. 10. FIG. 13 is a timing chart illustrating input and output signals of the data compensator of FIG. 10, in a 3D stereoscopic image mode. Referring to FIGS. 10 and 12, the compensation controller 331 receives the mode identification signal MODE_S, the reverse control signal REV, and the image data. For example, the compensation controller 331 may determine whether the image mode of the image data is the 2D flat image mode or the 3D stereoscopic image mode, based on the mode identification signal MODE_S.

The compensation controller 331 determines the image mode of the image data based on the mode identification signal MODE_S (step S310). For example, when the image mode of the image data is the 2D flat image mode, the compensation controller 331 generates the compensation data of the image data using the 2D compensation data stored in the LUT 335 (step S320).

When the image mode of the image data is the 3D stereoscopic image mode, the compensation controller 331 compares the polarity of the image data of the present frame with the polarity of the image data of the previous frame, based on the reverse control signal REV (step S330). When the polarity of the image data of the present frame is changed from the negative (−) polarity to the positive (+) polarity (step S331), the compensation controller 331 generates the third compensation data of the image data using the 3D compensation data stored in the LUT 335 (step S332).

For example, referring to FIGS. 12 and 13, the compensation controller 331 receives the left-eye L image data IN_DATA having a 128 grayscale value in an (N−1)-th frame F(n−1). The compensation controller 331 compares the polarity (+) of the left-eye L image data of the (N−1)-th frame F(n−1) with the polarity (−) of the right-eye R image data of an (N−2)-th frame F(n−2), based on the reverse control signal REV. The compensation controller 331 determines that the polarity of the left-eye L image data of the (N−1)-th frame F(n−1) is reversed with respect to the polarity of the right-eye R image data of the (N−2)-th frame F(n−2). Then, the compensation controller 331 generates the third compensation data having a 130 grayscale value, using the LUT 335, and outputs the third compensation data having the 130 grayscale value as OUT_DATA.

When the polarity of the image data of the present frame is substantially the same as the polarity of the image data of the previous frame (step S330), the compensation controller 331 maintains the image data, and outputs the image data without compensating the image data.

For example, referring to FIG. 13, the data compensator 330 receives the black image data IN_DATA having a 0 grayscale value, in an N-th frame Fn. The compensation controller 331 compares the polarity (+) of the black image data of the N-th frame Fn with the polarity (+) of the left-eye L image data of the (N−1)-th frame F(n−1), based on the reverse control signal REV. The compensation controller 331 determines that the polarity of the black image data of the N-th frame Fn is substantially the same as the polarity of the left-eye L image data of the (N−1)-th frame F(n−1). Then, the compensation controller 331 maintains the black image data having the 0 grayscale value, and outputs the image data having the 0 grayscale value, without compensating the image data.

When the polarity of the image data of the present frame is changed from the positive (+) polarity to the negative (−) polarity (step S331), the compensation controller 331 generates the fourth compensation data of the image data, using the 3D compensation data stored in the LUT 335 (step S333).

For example, referring to FIGS. 12 and 13, the data compensator 330 receives the right-eye R image data IN_DATA having the 128 grayscale value, in an (N+1)-th frame F(n+1). The compensation controller 331 compares the polarity (−) of the right-eye R image data of the (N+1)-th frame F(n+1) with the polarity (+) of the black image data of the N-th frame Fn, based on the reverse control signal REV. The compensation controller 331 determines that the polarity of the right-eye R image data of the (N+1)-th frame F(n+1) is reversed with respect to the polarity of the black B image data of the N-th frame Fn. Then, the compensation controller 331 generates the fourth compensation data having a 126 grayscale value as OUT_DATA, using the LUT 335, as shown in FIG. 12.

According to the present invention, the compensation data are generated by considering the polarity of the left-eye image data or the right-eye image data of the present frame and the polarity of the image data of the previous frame, so that luminance differences between the left-eye image data and the right-eye image data may be prevented, thereby improving image quality.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of processing three-dimensional (3D) stereoscopic image data, the method comprising:
 comparing the polarity of image data of a present frame with the polarity of image data of a previous frame; and
 compensating the image data of the present frame according to the result of the comparison by generating first compensation data using a first look-up table (LUT) when the polarity of the image data of the present frame is opposite to the polarity of the image data of the previous frame with respect to a reference voltage,
 wherein the image data of the present frame and the previous frame comprise different ones of left eye image data and right eye image data.

2. The method of claim 1, wherein the compensating of the image data of the present frame further comprises maintaining the image data of the present frame, when the polarity of the image data of the present frame is substantially the same as that of the image data of the previous frame, with respect to the reference voltage.

3. The method of claim 1, wherein the compensating of the image data of the present frame comprises generating second compensation data using a second LUT, when the polarity of the image data of the present frame is substantially the same as the polarity of the image data of the previous frame, with respect to the reference voltage.

4. The method of claim 1, wherein the image data of the previous frame are image data having a black grayscale value, and the image data of the present frame are left-eye image data or right-eye image data.

5. The method of claim 4, wherein the compensating of the image data of the present frame comprises to generating third compensation data using a third LUT, when the polarity of the image data of the present frame is a negative polarity with respect to a reference voltage, and the polarity of the image data of the previous frame is a positive polarity with respect to the reference voltage.

6. The method of claim 5, wherein the compensating of the image data of the present frame comprises generating fourth compensation data using the third LUT, when the polarity of the image data of the present frame is the positive polarity and the polarity of the image data of the previous frame is the negative polarity.

7. A display apparatus comprising:
 a display panel to display an image;
 a timing controller configured to compare the polarity of image data of a present frame with the polarity of image data of a previous frame and to compensate the image data of the present frame according to the result of the polarity comparison, the timing controller comprising:
  a control signal generator configured to generate a reverse control signal, such that the voltage of the reverse control signal is changed after a one frame period, in a 2D flat image mode, and the voltage of the reverse control signal is changed after a two-frame period, in a 3D stereoscopic image mode; and
  a data compensator configured to compensate the image data of the present frame, according to the result of the polarity comparison, which is based on the reverse control signal; and
 a data driver configured to convert data provided from the timing controller into a data voltage, to determine the polarity of the data voltage, and to output the data voltage to the display panel,
 wherein the data compensator is further configured to generate first compensation data using a first LUT, when the polarity of the image data of the present frame is opposite to the polarity of the image data of the previous frame, with respect to a reference voltage, in the 3D stereoscopic image.

8. The display apparatus of claim 7, wherein the data compensator is configured to maintain the image data of the present frame, when the polarity of the image data of the present frame is substantially the same as the polarity of the image data of the previous frame, with respect to the reference voltage, in the 3D stereoscopic image mode.

9. The display apparatus of claim 7, wherein the image data of the present frame and the previous frame comprise different ones of left-eye image data and right-eye image data.

10. The display apparatus of claim 7, wherein the data compensator is further configured to generate second compensation data using a second LUT, when the polarity of the image data of the present frame is substantially the same as the polarity of the image data of the previous frame, with respect to the reference voltage, in the 3D stereoscopic image mode.

11. The display apparatus of claim 10, wherein the data compensator is further configured to generate compensation data using the first LUT, in the 2D flat image mode.

12. The display apparatus of claim 7, wherein the data compensator is further configured to generate third compensation data using a third LUT, when the polarity of the image data of the present frame is a negative polarity with respect to a reference voltage, and the polarity of the image data of the previous frame is a positive polarity with respect to the reference voltage, in the 3D stereoscopic image mode.

13. The display apparatus of claim 12, wherein the data compensator is further configured to generate a fourth compensation data using the third LUT, when the polarity of the image data of the present frame is the positive polarity, and the polarity of the image data of the previous frame is the negative polarity.

14. The display apparatus of claim 13, the image data of the previous frame are image data having a black grayscale value, and the image data of the present frame are left-eye image data or right-eye image data.

15. The display apparatus of claim 12, wherein the data compensator is further configured to generate compensation data in the 2D flat image mode, using the third LUT.

* * * * *